(12) United States Patent
Mehta et al.

(10) Patent No.: US 11,907,311 B2
(45) Date of Patent: Feb. 20, 2024

(54) DYNAMIC WEBSITE CHARACTERIZATION FOR SEARCH OPTIMIZATION

(71) Applicants: Jatin V. Mehta, Voorhees, NJ (US); Stephen Joslyn Myers, Bear, DE (US)

(72) Inventors: Jatin V. Mehta, Voorhees, NJ (US); Stephen Joslyn Myers, Bear, DE (US)

( * ) Notice: Subject to any disclaimer, the term of this patent is extended or adjusted under 35 U.S.C. 154(b) by 42 days.

(21) Appl. No.: 17/692,061

(22) Filed: Mar. 10, 2022

(65) Prior Publication Data

US 2022/0292143 A1 Sep. 15, 2022

Related U.S. Application Data

(60) Provisional application No. 63/159,504, filed on Mar. 11, 2021.

(51) Int. Cl.
*G06F 16/953* (2019.01)
(52) U.S. Cl.
CPC .................. *G06F 16/953* (2019.01)
(58) Field of Classification Search
CPC .................................................. G06F 16/953
See application file for complete search history.

(56) References Cited

U.S. PATENT DOCUMENTS

| | | | | |
|---|---|---|---|---|
| 9,443,007 B2 * | 9/2016 | Donneau-Golencer | | G06F 16/22 |
| 10,817,914 B1 * | 10/2020 | Nath | ........... | G06Q 30/0277 |
| 10,891,341 B2 * | 1/2021 | Brown | ........... | G06F 16/24565 |
| 11,100,554 B1 * | 8/2021 | Gupta | ........... | G06Q 30/0641 |
| 11,410,186 B2 * | 8/2022 | Oberle | ........... | G06N 5/04 |
| 11,416,565 B2 * | 8/2022 | Tang | ........... | G06N 7/01 |
| 11,645,342 B2 * | 5/2023 | Pingol | ........... | G06F 16/953 |
| | | | | 707/706 |
| 2002/0156688 A1 * | 10/2002 | Horn | ........... | G06Q 30/0601 |
| | | | | 705/28 |
| 2006/0161535 A1 * | 7/2006 | Holbrook | ........... | G06Q 40/04 |
| 2007/0011146 A1 * | 1/2007 | Holbrook | ........... | G06Q 30/0603 |
| 2008/0126080 A1 * | 5/2008 | Saldanha | ........... | G06F 40/143 |
| | | | | 704/9 |
| 2008/0162526 A1 * | 7/2008 | Singh | ........... | G06F 16/381 |
| | | | | 707/E17.096 |
| 2009/0216910 A1 * | 8/2009 | Duchesneau | ........... | H01B 3/24 |
| | | | | 709/250 |
| 2010/0005001 A1 * | 1/2010 | Aizen | ........... | G06Q 30/02 |
| | | | | 705/14.73 |
| 2010/0317420 A1 * | 12/2010 | Hoffberg | ........... | G06Q 30/0282 |
| | | | | 463/1 |

(Continued)

*Primary Examiner* — Mark E Hershley
(74) *Attorney, Agent, or Firm* — Ashok Tankha

(57) ABSTRACT

A computer-implemented method and a content characterization system (CCS) for dynamically characterizing a website rendered in one or more of a plurality of languages are provided. The CCS receives website data, analyzes it for characterization of the website, and generates multiple structured data objects with a core object that the CCS connects with the website. When changes are made to the website, the CCS dynamically incorporates the changes into the structured data objects connected with the core object. When a search query is received from a querying network entity, the CCS communicates relevant structured data objects to the querying network entity to answer the query optimally, thereby providing an optimal characterization of the website.

7 Claims, 7 Drawing Sheets

(56) References Cited

U.S. PATENT DOCUMENTS

| | | | |
|---|---|---|---|
| 2011/0196854 A1* | 8/2011 | Sarkar | G06F 16/313 |
| | | | 707/E17.108 |
| 2014/0019443 A1* | 1/2014 | Golshan | G06F 16/9535 |
| | | | 707/723 |
| 2014/0052617 A1* | 2/2014 | Chawla | G06Q 20/102 |
| | | | 705/39 |
| 2014/0075004 A1* | 3/2014 | Van Dusen | G06F 16/90335 |
| | | | 709/223 |
| 2015/0106078 A1* | 4/2015 | Chang | G06F 16/35 |
| | | | 704/9 |
| 2016/0103861 A1* | 4/2016 | Jacob | G06F 16/958 |
| | | | 707/711 |
| 2016/0103913 A1* | 4/2016 | Jacob | G06F 16/9566 |
| | | | 707/709 |
| 2018/0131716 A1* | 5/2018 | Chantz | H04L 63/1425 |
| 2018/0165364 A1* | 6/2018 | Mehta | G06F 9/54 |
| 2018/0165375 A1* | 6/2018 | Silkey | G06F 16/986 |
| 2019/0042642 A1* | 2/2019 | Hatami-Hanza | G06Q 30/0207 |
| 2019/0340212 A1* | 11/2019 | Isager | G06F 16/972 |
| 2020/0250562 A1* | 8/2020 | Bly | G06F 18/285 |
| 2020/0394194 A1* | 12/2020 | Glover | G06F 16/24553 |
| 2021/0049219 A1* | 2/2021 | Weddeling | G06F 16/242 |
| 2021/0173854 A1* | 6/2021 | Wilshinsky | G06F 16/287 |
| 2022/0292160 A1* | 9/2022 | Mehta | G06F 16/972 |
| 2022/0292253 A1* | 9/2022 | Mehta | G06F 40/154 |

\* cited by examiner

DYNAMIC WEBSITE CHARACTERIZATION FOR SEARCH OPTIMIZATION

CROSS-REFERENCE TO RELATED APPLICATIONS

This application claims priority to and the benefit of the provisional patent application titled "A Method Of Dynamic Data Manipulation Of A Business Website Using An Omega Object", application No. 63/159,504, filed in the United States Patent and Trademark Office on Mar. 11, 2021. The specification of the above referenced patent application is incorporated herein by reference in its entirety.

BACKGROUND

Websites primarily rely on data that forms the content on the website and information related to the content that may not be explicitly provided on the websites in addition to the organization of the data and the aesthetics of design. Data in its unstructured form is stored in its native format, for example, media in their native formats, textual content that is not segregated into specific fields, etc., and does not have a predefined data model. As such, unstructured data cannot be processed and analyzed by conventional data tools and remains unprocessed until it is used. Unstructured data contains a large amount of insight, for example, effectiveness of marketing campaigns, buying trends, and customer needs and satisfaction. Insight from data is important for business websites to attract and provide maximum value to customers from what the business offers. These insights are useful for decisions on operations, predictive analytics, etc. Processing and analyzing unstructured data requires specialized tools and expertise. Structured data is formatted according to a predefined data model and can be interpreted by machine learning algorithms. Examples include dates, names, addresses, and any data that is formatted into precisely defined fields. Schema.org is a website with a repository that provides a standardized specification, that is, schemas, comprising glossary and markup language for injecting information about contents of webpages while marking up the webpages to provide structured data. A vast majority of information of businesses is stored as unstructured data and may websites do not include structured data due to challenges in implementing schemas in the markup of webpages at a level of each data element in the webpages. Artificial intelligence, machine learning, and data science algorithms can be used to extract intelligence as structured data from unstructured data. There is a need for a data tool that processes unstructured data in websites to generate structured data to harnesses the advantages of machine-interpretable structured data for business websites.

Structured data enables search engines indexing the webpages of a website to understand the content in the webpages to deliver useful and richly informative results to search queries and enhance visibility to relevant webpages. Search engines crawl and index information on websites and use algorithms to determine the results to show for search queries they receive. As part of search engine optimization (SEO), having structured data on the websites helps the search engines deliver better results from the websites. More informative and rich results comprise, for example, user reviews, images, frequently asked questions, and purchase links of products listed in the search results from a website. Digital marketing companies offer services to optimize websites for search engines, but shortcomings include significant expenses and dependence on the companies whenever content on the websites involve changes. There is a need for a data tool that generates structured data useful for search engines from websites to deliver rich results to search queries. Moreover, there is a need for a data tool that dynamically updates the structured data when there are changes to the website.

Types of schema markup used in structured data to enable rich results for search queries include resource description framework in attributes (RDFa), microdata, JavaScript object notation for linked data (JSON-LD), and other microformats. Of these, JSON-LD is a data-interchange format that is human and machine-readable. JSON-LD provides for collecting metadata and additional information corresponding to data in a website in a snippet of JavaScript code that can be added anywhere on a webpage as opposed to other formats that require adding schema.org markup to individual data elements on a webpage. JSON-LD enables provision of structured data independent of the markup and theming of a website. Besides, for websites that comprises information in multiple languages, structured data needs to be generated from website data in the multiple languages. There is a need for a data tool that generates structured data from unstructured data on a website without requiring changing the markup of individual data elements on the website. Moreover, there is a need to obtain rich information as structured data that appropriately characterizes a website even when it comprises information in multiple languages. Moreover, there is a need for a data tool that customizes the structured data presented to a search engine or another querying entity that connects to the website to tailor responses to specific search queries, thereby maximizing the value a website offers in response to a search query.

Hence, there is a long-felt need for a method and a system to dynamically generate structured data from websites handling changes to website content without requiring changing the markup of individual data elements on the website. There is also a need to customize the structured data provided in response to queries from an entity that connects to the websites through a network. Furthermore, there is a need for generating, analyzing, and harnessing structured data for information rendered in different languages on webpages to enhance search engine optimization of multi-language websites.

SUMMARY

This summary is provided to introduce a selection of concepts in a simplified form that are further disclosed in the detailed description. This summary is not intended to determine the scope of the claimed subject matter.

The computer-implemented method and the system disclosed herein address the above-recited need for generating structured data from unstructured data on websites and handling changes to website content dynamically without requiring changing markup of individual data elements on the website. Moreover, the computer-implemented method and the system disclosed herein generate structured data from website data comprising information, including information in multiple languages, and customize the generated structured data provided in response to queries from an entity that connects to the websites through a network, thereby dynamically characterizing a website rendered in one or more of multiple languages to be optimal for search queries made to the website.

The computer-implemented method disclosed herein employs a content characterization system executable by at least one processor configured to execute computer program instructions for dynamically characterizing a website rendered in one or more of multiple languages. The computer-implemented method comprises receiving website data from the website by the content characterization system. The computer-implemented method further comprises analyzing the received website data in one or more languages for characterization of the website by the content characterization system. Next, the computer-implemented method comprises generating structured data objects with a core object for the website based on the analysis of the website data by the content characterization system. In the above step, generation of the structured data objects with a core object for the website is based on preconfigured templates that adhere to schema.org and standards of search engines, content from the website data, and vocabulary and best practices as outlined in schema.org. The computer-implemented method further comprises connecting the generated structured data objects to the core object and the website by the content characterization system. The computer-implemented method further comprises dynamically incorporating changes made to the website into the structured data objects connected with the core object by the content characterization system without a need to regenerate the structured data objects. Next, the computer-implemented method comprises communicating relevant structured data objects from the connected structured data objects to a querying network entity in response to a search query from the querying network entity by the content characterization system. Thereby, the computer-implemented method provides an up-to-date characterization of the website optimal to the search query.

The system disclosed herein dynamically characterizes a website rendered in one or more of multiple languages. The system comprises a non-transitory, computer readable storage medium configured to store computer program instructions and data defined by a content characterization system. The system further comprises at least one processor communicatively coupled to the non-transitory, computer readable storage medium. The at least one processor is configured to execute the defined computer program instructions. The system further comprises the content characterization system. The content characterization system comprises a data reception module configured to receive website data from the website, a data reception module configured to receive website data from the website, an analysis module configured to analyze the received website data in the one or more languages for characterization of the website, an object generation module configured to generate structured data objects with a core object for the website based on the analysis of the website data, a bridging module configured to connect the generated structured data objects to the core object and the website, the object generation module further configured to dynamically incorporate changes made to the website into the structured data objects connected with the core object without a need to regenerate the plurality of the structured data objects, and a communication module configured to communicate relevant structured data objects from the connected plurality of the structured data objects to a querying network entity in response to a search query from the querying network entity, thereby providing an up-to-date characterization of the website optimal to the search query. The content characterization system provides an optimal characterization of the website to querying networking entities via the structured data objects.

The computer-implemented method and the system disclosed herein generate structured data objects as nodes with a dynamic index-oriented object as a core object at the center of the nodes and pushes a specific node relevant to a specific search from a search engine, a social media platform, or a database to ensure that the characteristics of the website are crawled, catalogued, and displayed optimally. Examples of the querying network entity comprise the search engine, the social media platform, or the database comprising the website data.

In one or more embodiments, related systems comprise circuitry and/or programming for executing the methods disclosed herein. The circuitry and/or programming are any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific components, modules, and methods disclosed herein. The description of a component, or a module, or a method step referenced by a numeral in a drawing is applicable to the description of that component, or that module, or that method step shown by that same numeral in any subsequent drawing herein.

DETAILED DESCRIPTION

Figure 1:
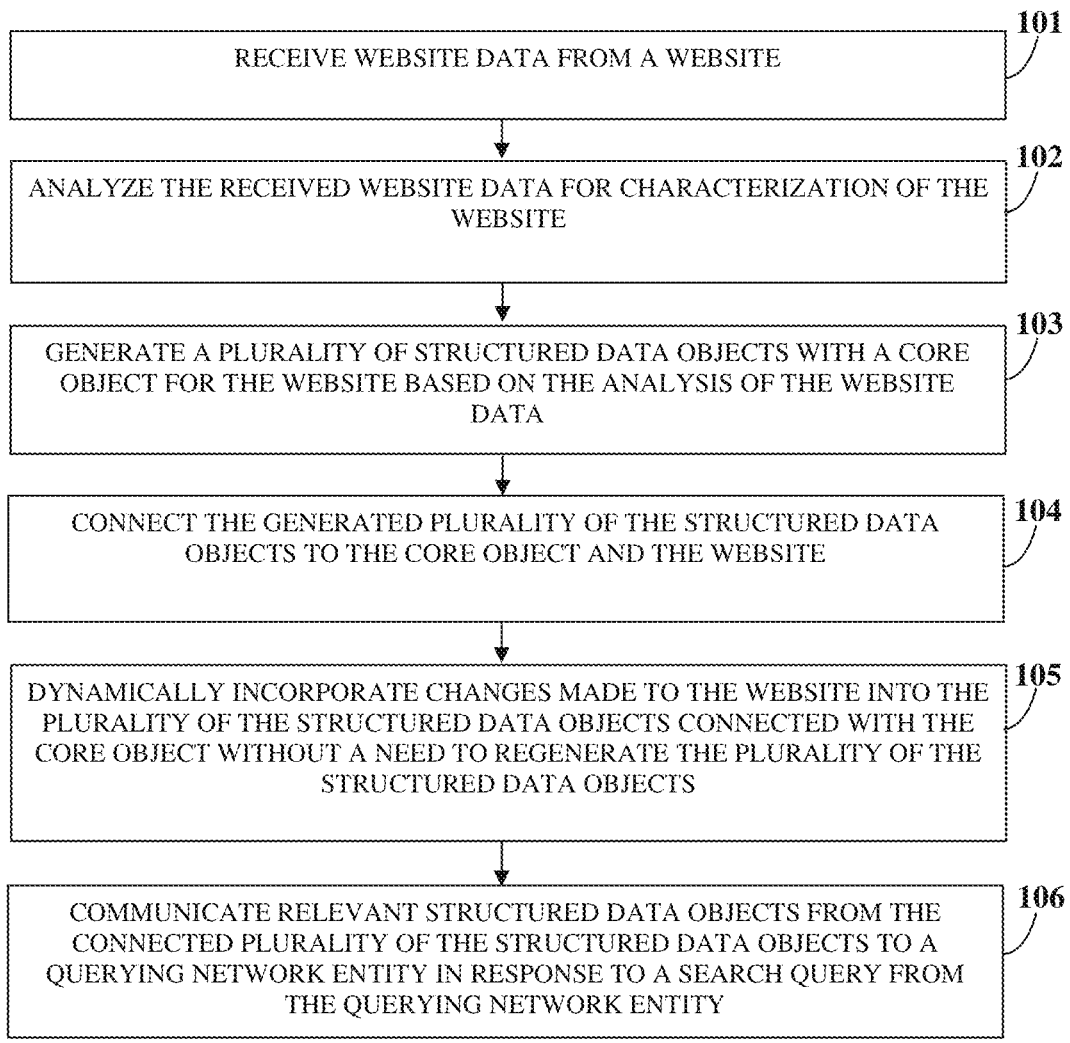
FIG. 1 illustrates a method for dynamically characterizing a website rendered in one or more of multiple languages.

Various aspects of the disclosure herein may be embodied as a system, a method, or a non-transitory, computer-readable storage medium having one or more computer-readable program codes stored thereon. Accordingly, various embodiments of the disclosure herein may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit".

Disclosed herein is a computer-implemented method and a system for dynamically characterizing a website rendered in one or more of multiple languages. The computer-implemented method and the system disclosed herein relate to online indexing in general. More specifically, the computer-implemented method and the system disclosed herein relate to dynamic online indexing of a website. As used herein, 'indexing' refers to a process by which software algorithms, for example, algorithms in search engines such as the Google® search engine of Google Inc., the Bing® search engine of Microsoft Corporation, the Yahoo® search engine of Yahoo! Inc., and the Yandex® search engine of Yandex, Ltd., collect and organize information about websites to provide relevant and fast responses to queries made on the search engines. The search engines store the information in an index, for example, in a database, as structured data. The index enables fast and accurate retrieval of information about websites in response to a search query similar to the way a card catalog of a library is used for books. The information about websites comprises information about textual content, attributes describing markup of the content, media, etc., on the website. As used herein, 'structured data' refers to a standardized format for storing and classifying information about a page and its content. Structured data comprises, for example, data stored in precisely defined fields such as dates, names, addresses, credit card numbers, etc., and data in tabular format with relationship between different rows and columns. The computer-implemented method and the system also draw from schema.org, which is a website and a repository that provides a standardized specification comprising glossary and markup language, for example, hypertext markup language (HTML) tags, for injecting information about contents of webpages while marking up the webpages. This standardized specification provides structured data enabling search engines indexing the webpages to understand the content of the webpages to deliver useful results to search queries and enhance visibility to relevant webpages.

The computer-implemented method and the system disclosed herein receive and analyze information, including information rendered in multiple languages, on a website, that is, website data, and generate structured data as structured data objects with an iMetadex™ Omega Object, hereinafter referred to as a core object, and connect the structured data objects and the core object to the website to help search engines index a website faster and display listings of websites more effectively in their results in response to a search query. The computer-implemented method and the system, via the core object, shape the information displayed by the listings of websites in response to search queries, by giving the search engines specific instructions about content in the websites from the structured data objects and how the content should be indexed. By dynamically characterizing a website, the computer-implemented method and the system provide for faster and easier indexing of the website by the search engines and provide more control over search results displayed by the search engines in response to search queries. Moreover, the computer-implemented system and the method disclosed herein generate, analyze, and harness structured data rendered in different languages on webpages to enhance search engine optimization of multi-language websites.

FIG. 1 illustrates a method for dynamically characterizing a website rendered in one or more of multiple languages. The method employs a content characterization system that is executable by at least one processor that is configured to execute computer program instructions for performing the method. The content characterization system receives 101 website data from the website, for example, via a uniform resource locator (URL) of the website or through direct access to corresponding files stored at the backend. The content characterization system provides a graphical user interface (GUI) for a user to manually input one or more URLs for the content characterization system to fetch the website data. For example, the content characterization system obtains a hypertext markup language (HTML) source code of the website comprising the website data.

The content characterization system analyzes 102 the received website data in one or more of multiple languages for characterization of the website. In an embodiment, the content characterization system employs artificial intelligence, machine learning, fuzzy logic, and data science in algorithms to analyze the received website data. The content characterization system also analyzes information in multiple languages, for example, natural languages such as English, Mandarin, Hindi, French, German, Spanish, etc., if present in the website data whether it is in unstructured or structured form. Moreover, the content characterization system utilizes a repository of schema codes from schema.org and draws from pre-built templates that adhere to standards on schema.org and those on major search engines to recognize data elements and obtain metadata corresponding to the received website data. To analyze the website data, the content characterization system crawls and indexes the website data by executing a web crawler from one or more of the search engines, or one or more of the media platforms, or any combination thereof, via one or more application programming interfaces (APIs) provided by the search engines and/or media platforms. The process of crawling a website to index website data is also disclosed in U.S. Patent Application publication no. 2018/0165364A1, which is incorporated herein by reference. The present may utilize the process of website crawling and website indexing disclosed in U.S. Patent Application publication no. 2018/0165364A1. The process of crawling a website to index website data is part of a method for validating and coding content of an electronic document for search engine optimization disclosed in U.S. Patent Application publication no. 2018/0165364A1.

The content characterization system generates 103 multiple structured data objects with a core object for the website based on the analysis of the website data. As used herein, 'data object' refers to a collection of data, each of which has its own identification, data type, and attributes, that is considered a single unit of data with declared attributes such as a data type for the collection of data. Based on the analysis of the website data, the content characterization system devises structural data elements for the website, which it then evolves into structured data objects with a core object. The content characterization system generates the structured data objects for the website using preconfigured templates that adhere to schema.org and standards of Google®, Bing®, Yahoo®, Yandex®, and other search engines, content from the website data comprising textual content, attributes describing markup of the content, media, etc., and vocabulary and best practices as outlined in schema.org to suit multiple types of structured data objects. Structured data objects can be of different types that are defined by the content characterization system depending on the data items that the structured data objects comprise. The content characterization system captures not only attributes and metadata about media in the website data, but the media itself in textual format to thoroughly characterize the website, for example, in response to search queries from querying network entities. The content characterization system transcribes audio and video data in the website data into text form and converts the transcribed media data into structured data. In an embodiment, the content characterization system utilizes third-party tools and technology, for example, Express Scribe by NCH Software PTY LTD. of Colorado, USA; OTranscribe; and The FTW Transcriber by Tyger Valley Systems of Egham, UK, etc., for transcribing non-textual objects, giving closed captions, and subsequent translation into text. The content characterization system then generates structured data objects corresponding to the media data with appropriate data types, for example, image, audio, video, animation, media, three-dimensional (3D) model, place, dataset, digital document, etc. The content characterization system, thereby, generates multi-dimensional data objects that convey structured data corresponding to both textual and media content in the website. The content characterization system generates structured data objects that the website needs. The generated structured data objects are read by all major search engines, social networks, and databases in different encodings, for example, the resource description framework in attributes (RDFa), microdata, and JavaScript object notation for linked data (JSON-LD). The content characterization system also generates a dynamic index-oriented object as a core object for the website. The core object is also a structured data object that is a center facing item in the structured data, for example, in JSON-LD code, of the website. In an embodiment, depending on the website, the received website data comprises unstructured data, structured data, or both. By analyzing the received website data, devising structural data elements, and evolving those structural data elements to generate structured data objects with the core object, the content characterization system transforms unstructured data in the received website data into the structured data objects and also conforms structured data already present in the received website data to preconfigured templates, best practices, and vocabulary prescribed by schema.org and major search engines. The content characterization system stores the generated structured data objects in a database.

The content characterization system connects 104 the generated structured data objects to the core object and the website. In an embodiment, the content characterization system connects the generated structured data objects to the core object by creating JavaScript object notation for linked data (JSON-LD) nodes with the core object at the center and connected to all the other nodes. The content characterization system connects the JSON-LD nodes with the core object at its center to the website using an application programming interface (API) key. The content characterization system incorporates 105 changes to the website into the connected structured data objects with the core object dynamically without a need to regenerate the structured data objects. In the embodiment where the content characterization system creates JSON-LD nodes corresponding to the structured data objects, the content characterization system uses the connection of the JSON-LD nodes with the core object at its center to the website for updating the structured data objects. The content characterization system generates structured data from the unstructured data incorporating the changes made to the website dynamically and incorporates the generated structured data into the existing structured data objects and creates new structured data objects if new data elements not captured by the existing structured data objects are identified in the changes. For example, when a webpage on the website is updated, the content characterization system analyzes updated hypertext markup language (HTML) tags in the website data, comparing the updated HTML tags to the website data incorporated as structured data in the generated structured data objects. The content characterization system updates the generated structured data objects accordingly. Specifically, when the changes in the website data comprise additional data elements and new data types that surpass a predefined threshold, the content characterization system generates new structured data objects corresponding to those changes. The content characterization system connects new structured data objects, if any are generated, to the core object and the website dynamically. For example, consider client 1, a website for a small business that comprises an article that is characterized by the content characterization system. When data on the website changes, by way of addition of media on the website, the content characterization system reanalyzes the website and picks up from the analysis the presence of video or audio. The content characterization system then checks preconfigured templates that adhere to schema.org and standards of Google®, Bing®, Yahoo®, Yandex®, and other search engines and vocabulary and best practices as outlined in schema.org and applies a recipe for what goes into schema corresponding to the received video or audio. The content characterization system incorporates the video or audio as additional data objects into a profile for client 1 that now comprises structured data elements corresponding to "small business", "article", "video" and "audio". The new profile for client 1 serves as a dynamic core object that characterizes the website.

When a network entity, for example, a search engine, a social media platform, a database, or a software program on a network-connected electronic device, tries to connect to the website using a search query, the content characterization system communicates 106 relevant structured data objects from the structured data objects connected to the core object and the website to the querying network entity. In an embodiment, the content characterization system uses web search transaction logs to identify the direction of a search query at the web site. If the search query originates from an Internet Protocol (IP) address that the content characterization system identifies to be a social media platform, the content characterization system recognizes the social media platform to communicate structured data objects related to the search query that are most relevant to the social media platform. The content characterization system determines the structured data objects that form the best fit for the received search query by analyzing the search query, and, via the core object, responds with the relevant structured data objects providing rich and meaningful data from the website. For example, the content characterization system presents to the querying network entity those structured data objects that correspond to the analyzed hypertext markup language (HTML) tags of the website data, which are most relevant to the received search query. The search engine, the social media platform, or the database passing on the search query gets results that are rich in relevant information from the website by way of helpful description of data in the results, additional information corresponding to next steps expected after the search query, confirmation of information in the results from other credible websites, better rendition of the results through markup and accompanying media, etc.

In combination with the dynamic incorporation of changes to the website in the connected structured data objects, the tailored response to a search query ensures an up-to-date characterization of the website that is optimal to the search query. In the embodiment where the content characterization system creates JavaScript object notation for linked data (JSON-LD) nodes for the structured data objects, the content characterization system shifts the JSON-LD nodes via the JSON-LD node corresponding to the core object to fit JSON-LD nodes corresponding to a relevant structured data category for display on an appropriate search engine, social network, or database query. The content characterization system pushes a specific JSON-LD node relevant to the specific search from a querying network entity such as a search engine, a social media platform, or a database to ensure that the querying network entity crawls, catalogues, and displays the characteristics of the website optimally. The content characterization system employs artificial intelligence, machine learning, fuzzy logic, and data science algorithms in analyzing the website data, generating the structured data objects with the core object, dynamically incorporating changes in website data in the structured data objects, and determining structured data objects relevant to a received search query. Moreover, the content characterization system employs block chain technology to ensure fidelity of data against possibility of data corruption that might affect the website data. Furthermore, the content characterization system employs virtual reality technology when generating structured data from unstructured data comprising virtual reality data objects in the website data. The content characterization system handles most data types website data may contain and remains agile for update as required.

As an illustration, a snippet of structured data that the content characterization system extracts from an analysis of website data from a webpage to generate structured data objects is shown below. In various embodiments, the content characterization system devises structural data elements in different formats, for example, microdata, resource description framework in attributes (RDFa), and JavaScript object notation for linked data (JSON-LD). The snippet below shows structured data elements in these formats for website data comprising contact information of an organization, MetaSense Marketing Management Inc., the name of an employee therein, Mr. Jatin V Mehta, and a brief introduction to the organization.

```
//Microdata Example
<div itemscope itemtype="https://schema.org/Organization">
<span itemprop="name">MetaSense Marketing Management Inc.</span>
Contact Details:
<div itemprop="address" itemscope itemtype="https://schema.org/PostalAddress">
Main address:
<span itemprop="streetAddress">403 Commerce Ln Suite 5, West Berlin</span>
<span itemprop="postalCode">08091</span>
<span itemprop="addressLocality">NJ, United States</span>
</div>
Tel:<span itemprop="telephone">866-875-META (6382)</span>,
E-mail: <span itemprop="email">info@metasensemarketing.com</span>
<span itemprop="alumni" itemscope itemtype="https://schema.org/Person">
<span itemprop="name">Jatin V Mehta</span>
</span>,
History: We are a full-service digital marketing agency SEO company in New Jersey &
Philadelphia that takes pride in creating successful, comprehensive marketing plans and
is the only company in the world to offer the patented iMetaDex ™ technology.
</div>
//RDFa Example
<div vocab="https://schema.org/" typeof="Organization">
<span property="name">MetaSense Marketing Management Inc.</span>
Contact Details:
<div property="address" typeof="PostalAddress">
Main address:
<span property="streetAddress">403 Commerce Ln Suite 5, West Berlin</span>
<span property="postalCode">08091</span>
<span property="addressLocality">NJ, United States</span>
</div>
Tel:<span property="telephone">866-875-META (6382)</span>,
E-mail: <span property="email">info@metasensemarketing.com</span>
<span property="alumni" typeof="Person">
<span property="name">Jatin V Mehta</span>
</span>
History: We are a full-service digital marketing agency SEO company in New Jersey &
Philadelphia that takes pride in creating successful, comprehensive marketing plans and
is the only company in the world to offer the patented iMetaDex ™ technology.
</div>
//JSON Example
<script type="application/ld+json">
{
"@context": "https://schema.org",
"@type": "Organization",
"address": {
"@type": "PostalAddress",
"addressLocality": "NJ, United States",
"postalCode": "08091",
"streetAddress": "403 Commerce Ln Suite 5, West Berlin"
},
"email": "info@metasensemarketing.com",
"member": [
{
"@type": "Organization"
},
```

```
{
"@type": "Organization"
}
],
"alumni": [
{
"@type": "Person",
"name": "Jatin V Mehta"
}
],
"name": "MetaSense Marketing Management Inc.",
"telephone": "866-875-META (6382)"
}
</script>
```

Consider an example for dynamically characterizing a website of an organization, where the website is rendered in one or more of a plurality of languages. The snippet below shows structured data elements in JavaScript Object Notation (JSON) format for website data comprising contact information of an organization, MetaSense Marketing Management Inc., the name of an employee therein, Mr. Jatin V Mehta, and a brief introduction to the organization

```
//JSON Example
<script type="application/ld+json">
{
"@context": "https://schema.org",
"@type": "Organization",
"address": {
"@type": "PostalAddress",
"addressLocality": "NJ, United States",
"postalCode": "08091",
"streetAddress": "403 Commerce Ln Suite 5, West Berlin"
},
"email": "info@metasensemarketing.com",
"member": [
{
"@type": "Organization"
},
{
"@type": "Organization"
}
],
"alumni": [
{
"@type": "Person",
"name": "Jatin V Mehta"
}
],
"name": "MetaSense Marketing Management Inc.",
"telephone": "866-875-META (6382)"
}
</script>
```

The above schema code is applied to website content rendered in the English language. In an embodiment, if the website content is rendered in a different language, for example, Hindi, Spanish, Italian, Turkish, etc., the content characterization system detects the language using an artificial intelligence tool and converts the entire schema code above into the specific language of the website content.

The computer-implemented method and the content characterization system introduce several technical advantages over having search engines and other querying network entities parse unstructured data from the website. Structured data that the content characterization system communicates to querying network entities drives business results and increases organic traffic on search engines. It increases domain and page authority of the website, providing search engine optimization and increasing its ranking in search engine result pages and the click-through rates for the website. For example, if a website portrays products for sale and has product reviews, the content characterization system answers search queries by providing for richer results with product reviews of queried products right in the search result. As another example, search results can resemble frequently asked questions (FAQ) sections of websites with specific and relevant answers to queries comprising information surrounding the original query obviating further search for more information. This draws more attention to listings on the website and increases conversion rates by increasing likelihood of purchases of the products as opposed to having to search deeper and harder on other websites for satisfactory amount of information on similar products. By dynamically characterizing the website, the content characterization system affords control over how a brand related to the website appears in search results besides increasing the presence of the website in search results. Moreover, it reduces pay-per-click marketing cost incurred when trying to increase traffic to the website. Furthermore, the content characterization system improves readability of content on the website through different access modes comprising access via mobile devices, desktop computers, voiceover of content, etc. In addition, the content characterization system provides for greater insights from analytics of the website besides helping the website appear in knowledge graphs of search engines, for example, the knowledge graph of Google®.

Figure 2:
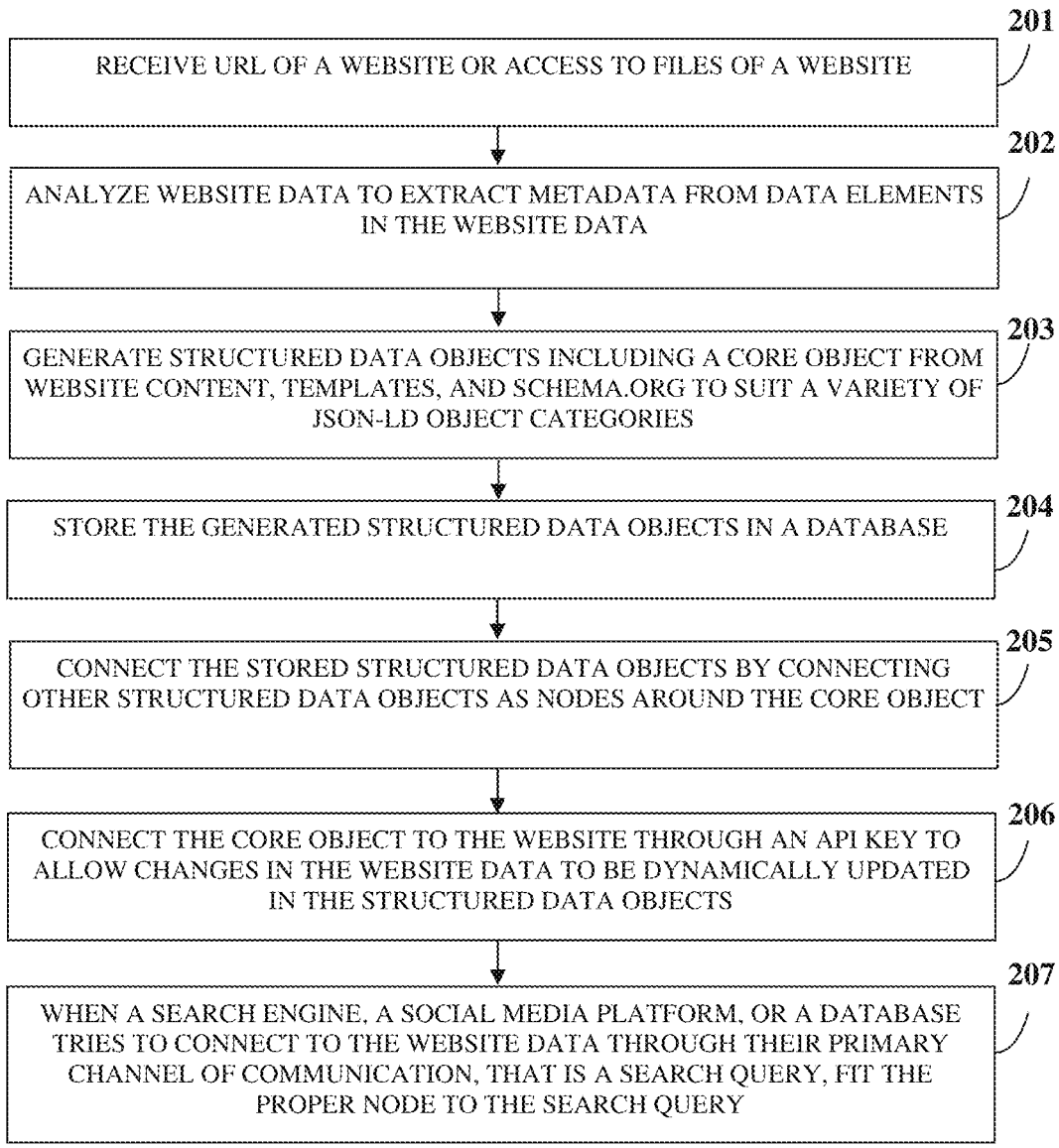
FIG. 2 exemplarily illustrates a flowchart comprising the steps performed by a content characterization system for optimally representing a website to a querying network entity.

FIG. 2 exemplarily illustrates a flowchart comprising the steps performed by a content characterization system for optimally representing a website to a querying network entity. The content characterization system receives 201 a uniform resource locator (URL) or access to files of a website, thereby getting access to website data. The content characterization system analyzes 202 the website data to extract metadata from data elements in the website data. The content characterization system analyzes unstructured data in the website data to glean information about data elements comprising textual and media content. The content characterization system uses algorithms drawing on artificial intelligence, machine learning, and data science disciplines to analyze the website data. In cases where the website data comprises virtual reality objects, the content characterization system employs algorithms that process virtual reality objects to analyze the virtual reality objects.

The content characterization system generates 203 structured data objects including a core object from website content, templates, and schema.org to suit a variety of JavaScript object notation for linked data (JSON-LD) object categories. The content characterization system uses the results of the analysis as a basis for generating structured data objects in keeping with templates that are pre-configured to standards and best practices espoused by search engines and schema.org. Based on data types in the content of the website data, the content characterization system generates the structured data objects in a variety of JSON-LD object categories drawing on the best practices corresponding to each JSON-LD object category. The core object is as disclosed in the detailed description of FIG. 1. The content characterization system stores 204 the generated structured data objects in a database for use in response to search queries directed at the website and as a base for any updates that may be necessary when changes are made to the website.

The content characterization system connects 205 the stored structured data objects by connecting other structured data objects as nodes around the core object. The content characterization system uses the core object as a central node to update other structured data objects at the nodes around the core object and direct appropriate nodes at search queries directed at the website. The content characterization system connects 106 the core object to the website through an application programming interface (API) key to allow changes in the web site data to be dynamically updated in the structured data objects. The content characterization system recognizes changes made to the website through the API key and analyzes the changes to obtain structured data from the changes. The content characterization system then incorporates the changes in the structured data objects, updating them via the core object. When the changes in the website data surpass a predefined threshold, the content characterization system generates new structured data objects corresponding to those changes and connects the newly generated structured data objects as JSON-LD nodes to the core object.

When a search engine, a social media platform, or a database tries to connect to the website data through their primary channel of communication, that is a search query, the content characterization system fits 107 the proper node to the search query. The content characterization system analyzes the search query and determines the structured data objects that form an appropriate response to the search query. The content characterization system then shifts the nodes corresponding to those structured data objects to fit those nodes to the search query providing a characterization of the website that is optimal to the search query. The search engine, the social media platform, or the database passing on the search query gets results that are rich in relevant information from the website.

Figure 3:
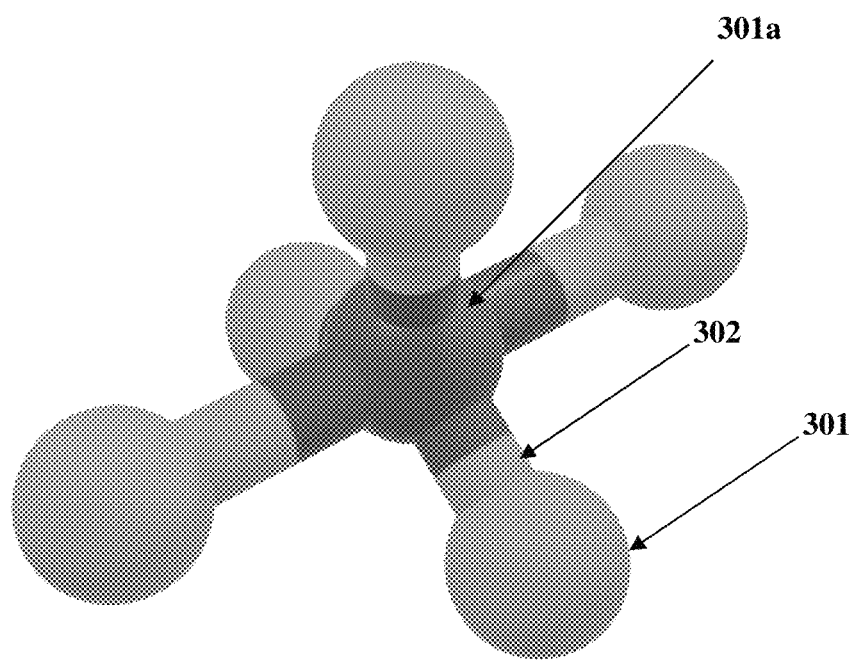
FIG. 3 exemplarily illustrates connection of structured data objects to a core object generated by the content characterization system.

FIG. 3 exemplarily illustrates connection of structured data objects to a core object generated by the content characterization system. In an embodiment, the content characterization system creates JavaScript object notation for linked data (JSON-LD) nodes 301 for the structured data objects it generates from the analysis of website data from a website. The content characterization system analyzes a website to obtain structural data elements for the website, which is then evolved into structured data objects with a core object 301a. The content characterization system generates the structured data objects based on its analysis and pre-built templates that adhere to schema.org and standards of major search engines. The core object 301a is a JSON-LD node that is a center facing item in a JSON-LD code for the website. Once the JSON-LD nodes 301 are created, the content characterization system connects the other JSON-LD nodes 301 to the core object 301a through connections 302, and connects the core object 301a to the website. Through the connections 302 of the JSON-LD nodes 301 with the core object 301a, the content characterization system shifts the JSON-LD nodes 301 in response to a search query to fit a proper structured data category for display on a search engine, a social network, or a database making the search query.

Figure 4:
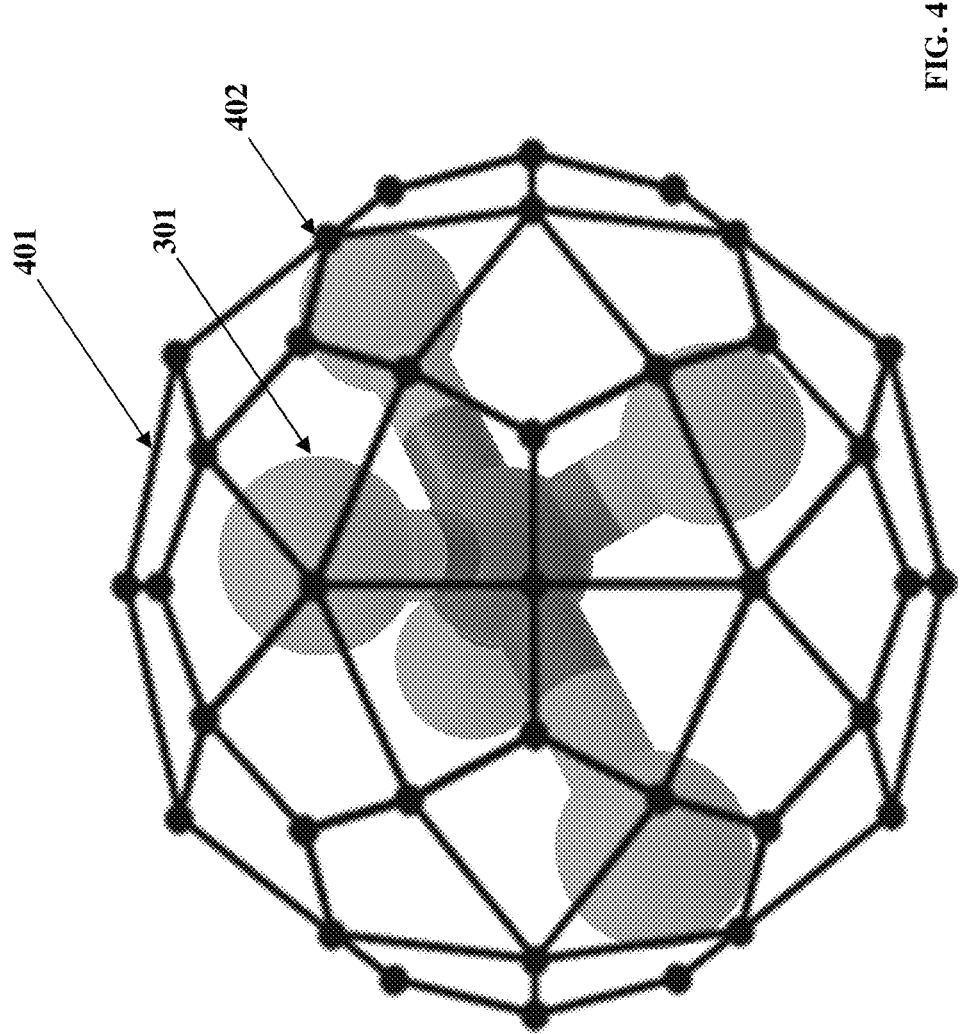
FIG. 4 exemplarily illustrates communication of structured data objects relevant to search queries from a querying network entity by the content characterization system.

FIG. 4 exemplarily illustrates communication of structured data objects relevant to search queries from a querying network entity by the content characterization system. The content characterization system analyzes a website, generates structured data objects and a core object, and connects the structured data objects with the core object at the center to the website. In an embodiment, the content characterization system, creates JavaScript object notation for linked data (JSON-LD) nodes 301 for the structured data objects and the core object. The JSON-LD nodes 301 are as disclosed in the detailed description of FIG. 3. Network entities such as search engines, social media platforms, and databases direct search queries 401 at the website. The content characterization system, via the core object, responds to the search queries 401 received from querying network entities by pushing specific nodes 402 to the front for specific queries, essentially filling in the blanks and ensuring that characteristics of the website are crawled, cataloged, and displayed optimally no matter the search engine, the social media platform, or the database the search queries 401 originate from.

Figure 5:
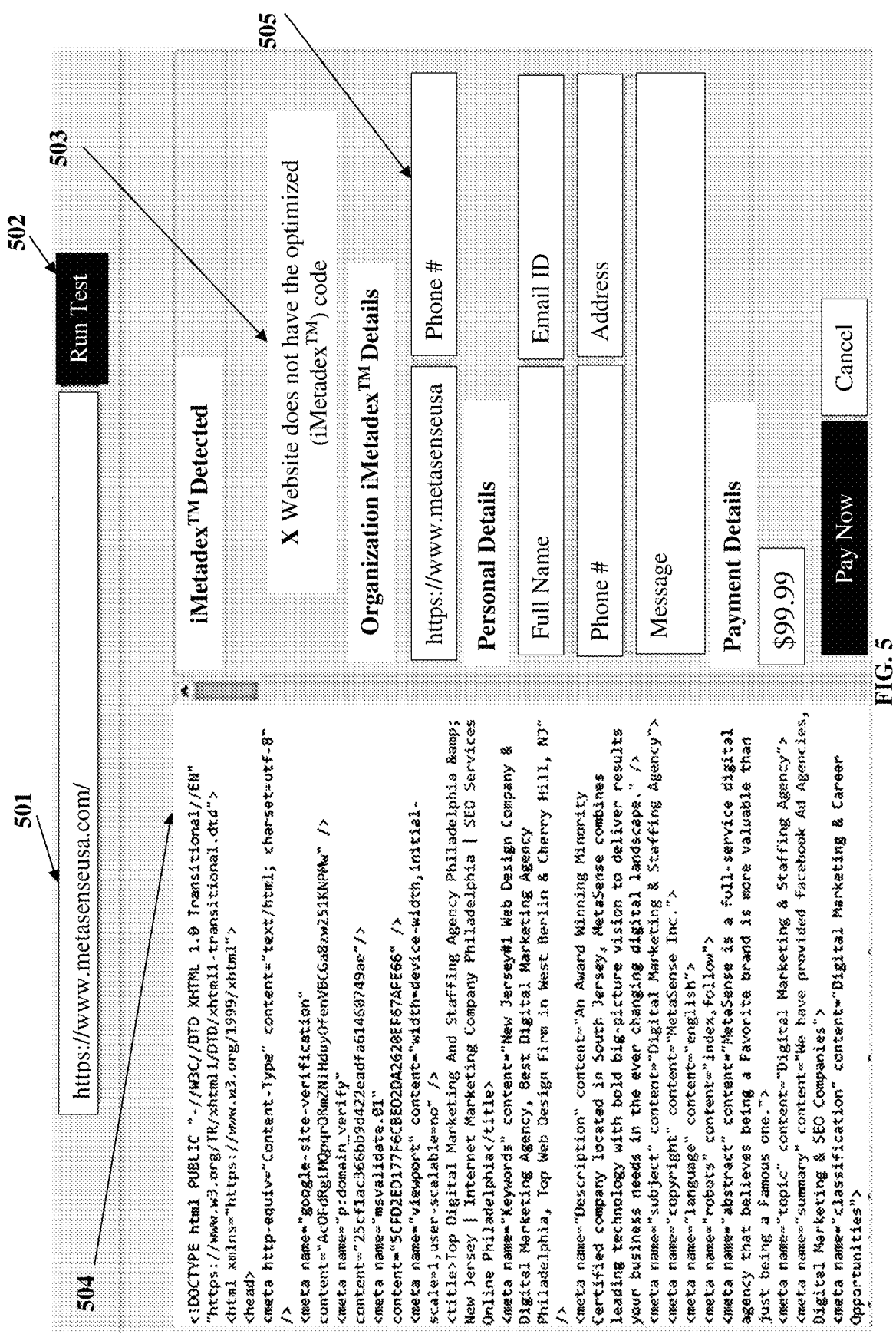
FIG. 5 exemplarily illustrates a screenshot of a user interface the content characterization system provides to a user to display structural data elements obtained from analysis of website data from a website.

FIG. 5 exemplarily illustrates a screenshot of a user interface the content characterization system provides to a user to display structural data elements obtained from analysis of website data from a website. The user interface comprises an address input field 501 to specify a uniform resource locator (URL) for the website. When the user enters the URL and selects an activation button 502, the content characterization system receives website data from the website and analyzes the website data. The content characterization system detects prior usage of the content characterization system for the website, and if not used, conveys a corresponding message in a message area 503. The content characterization system displays structured data through structural data elements that it produces from the analysis of the unstructured data from the website data in a content pane 504 on the user interface. If the website already uses the content characterization system, the content characterization system conveys the presence through a corresponding message in the message area 503 and displays the prior generated structured data in the content pane 504. If the content characterization system is not being used on the website, the content characterization system displays a purchaser information form and purchase options in a user area 505 on the user interface. The user can view the structured data generated by the content characterization system in the content pane and opt to purchase use of the content characterization system for the website via the purchase options in the user area 505 for dynamically characterizing the website rendered in one or more of multiple languages as disclosed in the detailed description of FIG. 1. If the website already uses the content characterization system, the content characterization system displays purchase details in the user area 505.

Figure 6:
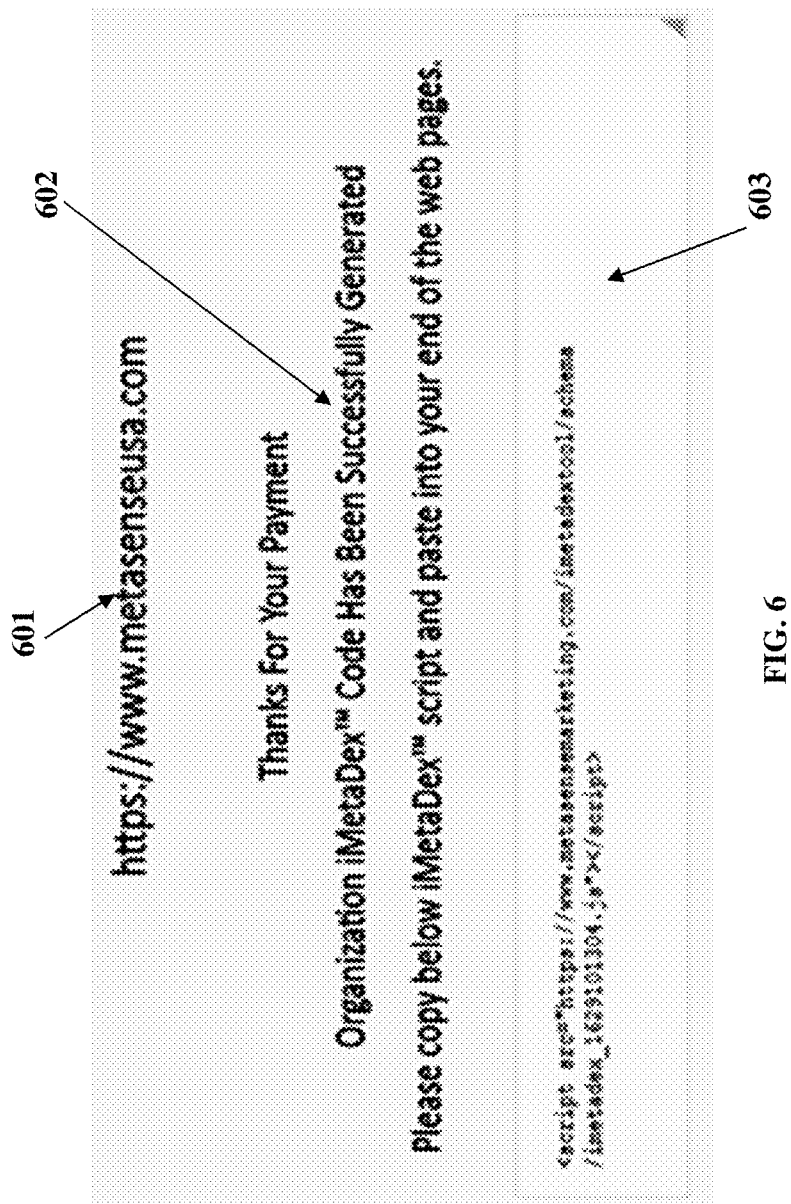
FIG. 6 exemplarily illustrates a screenshot of a user interface the content characterization system provides to a user to avail services of the content characterization system for a website.

FIG. 6 exemplarily illustrates a screenshot of a user interface the content characterization system provides to a user to avail services of the content characterization system for a website. When a user purchases use of the content characterization system for a website via a user interface exemplarily illustrated in FIG. 5, the content characterization system displays a service window 601. The service window 601 comprises acknowledgement of receipt of a payment towards use of the content characterization system and the website for which the usage of the content characterization system is authorized in a service message 602. In addition, the service message 602 comprises instructions for enabling the content characterization system on the website. The content characterization system generates and displays a script that the user needs to add on each webpage of the website in a script box 603 in the service window 601. On adding the script in the script box 603 to each webpage of the website, the content characterization system generates and connects structured data objects along with a core object to the website to dynamically characterize the website as disclosed in the detailed description of FIG. 1.

Figure 7:
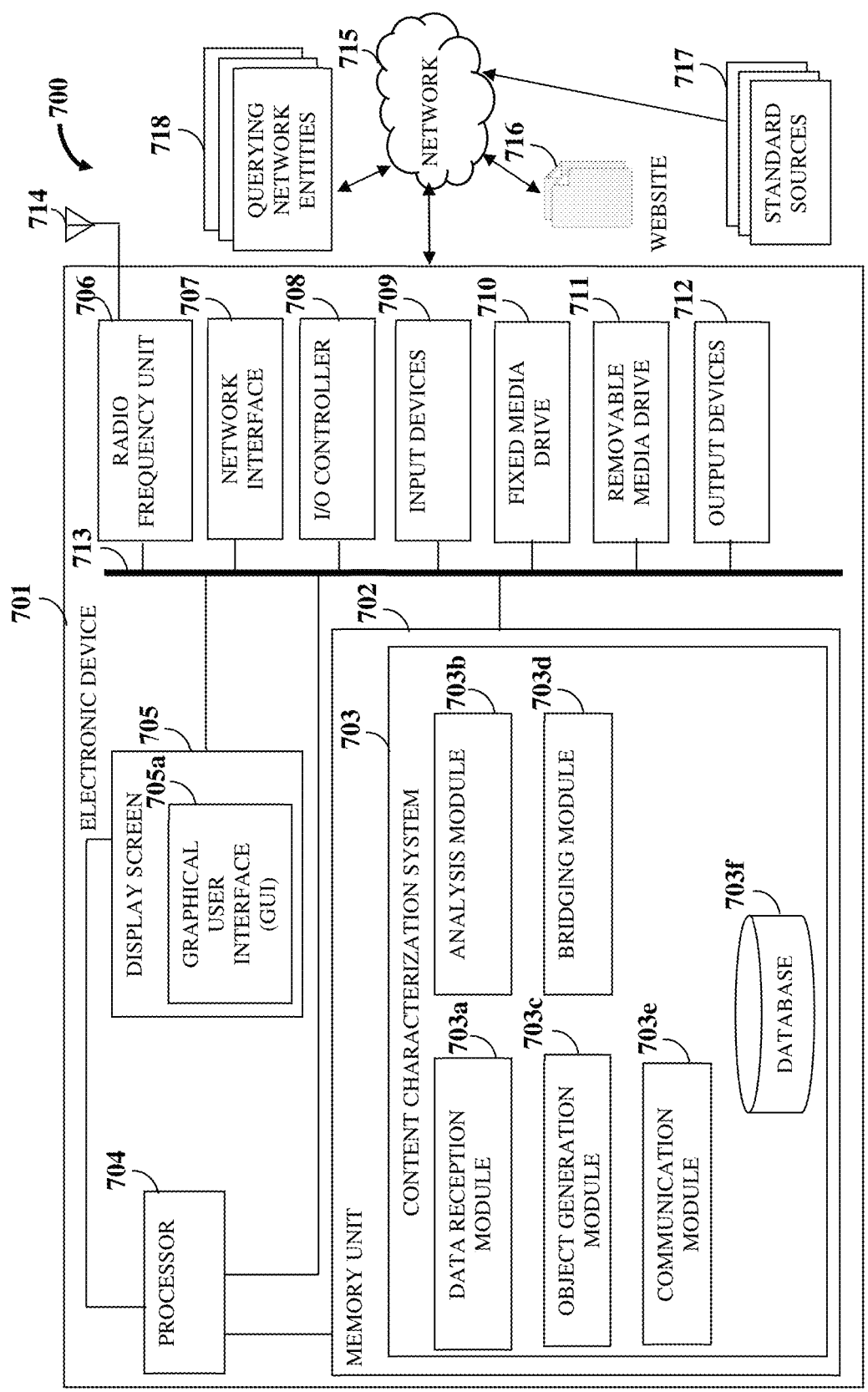
FIG. 7 illustrates an architectural block diagram of an exemplary implementation of a system for dynamically characterizing a website rendered in one or more of multiple languages.

FIG. 7 illustrates an architectural block diagram of an exemplary implementation of a system 700 for dynamically characterizing a website 716 rendered in one or more of multiple languages. The system 700 disclosed herein comprises the content characterization system 703. The content characterization system 703 is implemented on an electronic device 701, for example, a personal computer, a tablet computing device, a mobile computer, a portable computing device, a laptop, a touch device, a workstation, a server, a portable electronic device, a network enabled computing device, an interactive network enabled communication device, any other suitable computing equipment, combinations of multiple pieces of computing equipment, etc. In an embodiment, the computing equipment is used to implement applications such as media playback applications, a web browser, an electronic mail (email) application, a calendar application, etc., with one or more servers associated with one or more online services.

The content characterization system 703 communicates with a website 716 that it dynamically characterizes, standard sources 717 that the content characterization system 703 draws templates and best practices for generating structured data from, and querying network entities 718 such as search engines, social media platforms, databases, and querying software implemented on network-connected electronic devices via a network 715, for example, a short-range network or a long-range network. The network 715 is, for example, the Internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of Zig-Bee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In various embodiments, the network 715 is a wired network, or a wireless network, or a combination of networks using different protocols. In an embodiment, the content characterization system 703 is accessible to users availing services of the content characterization system 703 through a broad spectrum of technologies and devices such as cellular phones, tablet computing devices, etc., with access to the network 715.

As exemplarily illustrated in FIG. 7, the system 700 comprises a non-transitory, computer readable storage medium, for example, a memory unit 702 for storing programs and data, and at least one processor 704 communicatively coupled to the non-transitory, computer readable storage medium. As used herein, "non-transitory computer readable storage medium" refers to all computer readable media that contain and store computer programs and data, except for a transitory, propagating signal. Examples of the computer readable media comprise hard drives, solid state drives, optical discs or magnetic disks, memory chips, a read-only memory (ROM), a register memory, a processor cache, a random-access memory (RAM), etc. The non-transitory, computer readable storage medium stores computer program instructions defined by modules, for example, 703a, 703b, 703c, 703d, 703e, etc., of the content characterization system 703. The content characterization system 703 is installed and stored in the memory unit 702 of the electronic device 701. The memory unit 702 is used for storing program instructions, applications, and data. The memory unit 702 is, for example, a random access memory (RAM) or another type of dynamic storage device that stores information and instructions for execution by the processor 704. The memory unit 702 also stores temporary variables and other intermediate information used during execution of the instructions by the processor 704. The electronic device 701 further comprises a read only memory (ROM) or another type of static storage device that stores static information and instructions for the processor 704.

The processor 704 executes the computer program instructions defined by the modules, for example, 703a, 703b, 703c, 703d, 703e, etc., of the content characterization system 703. The processor 704 refers to any of one or more microprocessors, central processing unit (CPU) devices, finite state machines, computers, microcontrollers, digital signal processors, logic, a logic device, a user circuit, an application specific integrated circuit (ASIC), a field-programmable gate array (FPGA), a chip, etc., or any combination thereof, capable of executing computer programs or a series of commands, instructions, or state transitions. In an embodiment, the processor 704 is implemented as a processor set comprising, for example, a programmed microprocessor and a math or graphics co-processor. The processor 704 is selected, for example, from the Intel® processors such as the Itanium® microprocessor or the Pentium® processors, Advanced Micro Devices (AMD®) processors such as the Athlon® processor, UltraSPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The content characterization system 703 disclosed herein is not limited to employing a processor 704. In an embodiment, the content characterization system 703 employs a controller or a microcontroller.

As exemplarily illustrated in FIG. 7, the system 700 further comprises a display screen 705, on which, a graphical user interface (GUI) 705a is displayed for interaction with a user via the electronic device 701, a radio frequency (RF) unit 706, a network interface 707, an input/output (I/O) controller 708, input devices 709, a fixed media drive 710 such as a hard drive, a removable media drive 711 for receiving removable media, output devices 712, a data bus 713, and an antenna 714. The data bus 713 permits communications between the modules, for example, 702, 704, 705, 706, 707, 708, 709, 710, 711, and 712 of the content characterization system 703. The RF unit 706 allows transmission and/or reception of radio signals between the electronic device 701 and other computing devices, for example, device comprising the standard sources and the querying network entities, via the antenna 714. The display screen 705 comprises, for example, a video display, a liquid crystal display, a plasma display, an organic light emitting diode (OLED) based display, etc. The GUI 705a is, for example, an online web interface, a web based downloadable application interface, a mobile based downloadable application interface, etc.

The network interface 707 enables connection of the content characterization system 703 in the electronic device 701 to the network 715. In an embodiment, the network interface 707 is provided as an interface card also referred to as a line card. The network interface 707 comprises, for example, of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on a transmission control protocol (TCP)/internet protocol (IP), interfaces based on wireless communications technology such as satellite technology, RF technology, near field communication (NFC), etc. The I/O controller 708 controls input actions and output actions performed by the content characterization system 703.

The input devices 709 are used for inputting data into the content characterization system 703. A user of the electronic device 701 uses the input devices 709 to input data, for example, website data or any unstructured data that needs to be crawled and catalogued to obtain structured data, into the content characterization system 703. The input devices 709 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

In an embodiment as exemplarily illustrated in FIG. 7, the content characterization system 703 comprises a data reception module 703a, an analysis module 703b, an object generation module 703c, a bridging module 703d, a communication module 703e, and one or more databases 703f stored in the memory unit 702. The database(s) 703f of the content characterization system 703 is any storage area or medium used for storing data and files. In an embodiment, the database(s) 703f is, for example, any of a structured query language (SQL) data store or a not only SQL (NoSQL) data store such as the Microsoft® SQL Server®, the Oracle® servers, the MySQL® database of MySQL AB Limited Company, the mongoDB® of MongoDB, Inc., the Neo4j graph database of Neo Technology Corporation, the Cassandra database of the Apache Software Foundation, the HBase™ database of the Apache Software Foundation, etc. In another embodiment, the database(s) 703f is a location on a file system. In another embodiment, the database(s) 703f is remotely accessible by the content characterization system 703 via the network 715. In another embodiment, the database(s) 703f is configured as a cloud-based database implemented in a cloud computing environment, where computing resources are delivered as a service over the network 715. As used herein, "cloud computing environment" refers to a processing environment comprising configurable, computing, physical and logical resources, for example, networks, servers, storage media, virtual machines, applications, services, etc., and data distributed over the network 715. The cloud computing environment provides on-demand network access to a shared pool of the configurable, computing, physical and logical resources. In an embodiment, the content characterization system 703 is a cloud computing-based platform implemented as a service for dynamically characterizing a website 716 rendered in one or more of multiple languages. In various embodiments, the content characterization system 703 is developed, for example, using the Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc.

The data reception module 703a receives website data from the website 716. The analysis module 703b analyzes the received website data including information in multiple languages, for example, natural languages such as English, Mandarin, Hindi, French, German, Spanish, etc., if present in the website data whether it is in unstructured or structured form for characterization of the website 716. The object generation module 703c generates multiple structured data objects with a core object for the website 716 based on the analysis of the website data. The object generation module 703c uses information comprising preconfigured templates and best practices from standard sources 717 comprising schema.org and standards of Google®, Bing®, Yahoo®, Yandex®, and other search engines. Moreover, the object generation module 703c uses content from the website data comprising textual content, attributes describing markup of the content, media, etc., and vocabulary and best practices as outlined in schema.org to generate multiple types of structured data objects.

In an embodiment, the received website data comprises one or more of unstructured data and structured data. Based on the analysis of the website data by the analysis module 703b, the object generation module 703c devises structural data elements for unstructured data in the website data and evolves those structural data elements to generate structured data objects with the core object. The object generation module 703c thereby transforms unstructured data in the received website data into the structured data objects and also conforms structured data already present in the received website data to preconfigured templates, best practices, and vocabulary prescribed by schema.org and major search engines.

The bridging module 703d connects the generated structured data objects to the core object and the website 716. The communication module 703e communicates relevant structured data objects from the connected structured data objects to a querying network entity in response to a search query from the querying network entity, thereby providing an up-to-date characterization of the website 716 optimal to the search query. The structured data objects including the core object and the querying network entities are as disclosed in the detailed description of FIG. 1. The content characterization system 703 implements artificial intelligence, machine learning, and data science algorithms in the analysis of the website data, the generation and dynamic update of structured data objects, and the communication of structured data objects relevant to search queries from querying network entities. Moreover, the content characterization system 703 implements virtual reality and block chain technologies to analyze virtual objects in website data and ensure fidelity of website data respectively.

Computer applications and programs are used for operating the content characterization system 703. The programs are loaded onto the fixed media drive 710 and into the memory unit 702 of the electronic device 701 via the removable media drive 711. In an embodiment, the computer applications and programs are loaded directly on the electronic device 701 via the network 715. The output devices 712 output the results of operations performed by the content characterization system 703. For example, the content characterization system 703 renders the GUI 705a for a user of the electronic device 701 to interact with the content characterization system 703, using the output devices 712.

The processor 704 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., the Android® operating system of Google Inc., the Windows Phone® operating system of Microsoft Corporation, the BlackBerry® operating system of BlackBerry Limited, the iOS operating system of Apple Inc., the Symbian™ operating system of Symbian Foundation Limited, etc. The content characterization system 703 employs the operating system for performing multiple tasks. The operating system is responsible for management and coordination of activities and sharing of resources of the content characterization system 703. The operating system further manages security of the content characterization system 703, peripheral devices connected to the content characterization system 703, and network connections. The operating system employed on the content characterization system 703 recognizes, for example, inputs provided by a user of the content characterization system 703 such as a user of the electronic device 701, using one of the input devices 709, the output devices 712, files, and directories stored locally on the fixed media drive 710. The operating system on the content characterization system 703 executes different programs using the processor 704. The processor 704 and the operating system together define a computer platform for which application programs in high level programming languages are written. The operating system of the electronic device 701 determines the programming languages used in the content characterization system 703. For example, the Java® programming language is used for developing the content characterization system 703 on the electronic device 701 with an Android® operating system, while Objective-C® of Apple Inc., is used for developing the content characterization system 703 on the electronic device 701 with the iOS operating system, and the UNITY® libraries and platforms of Unity IPR ApS, LLC., are used developing the content characterization system 703 for both the Android® operating system and the iOS operating system.

The processor 704 retrieves instructions defined by the data reception module 703a, the analysis module 703b, the object generation module 703c, the bridging module 703d, and the communication module 703e stored in the memory unit 702, for performing respective functions disclosed above. The processor 704 retrieves the instructions for executing the modules, for example, 703a, 703b, 703c, 703d, 703e, etc., of the content characterization system 703 from the memory unit 702. A program counter determines the location of the instructions in the memory unit 702. The program counter stores a number that identifies the current position in a program of each of the modules, for example, 703a, 703b, 703c, 703d, 703e, etc., of the content characterization system 703. The instructions fetched by the processor 704 from the memory unit 702 after being processed are decoded. The instructions are stored in an instruction register in the processor 704. After processing and decoding, the processor 704 executes the instructions, thereby performing processes defined by those instructions.

At the time of execution, the instructions stored in the instruction register are examined to determine the operations to be performed. The processor 704 then performs the specified operations. The operations comprise arithmetic operations and logic operations. The operating system performs multiple routines for performing a number of tasks required to assign the input devices 709, the output devices 712, and the memory unit 702 for execution of the modules, for example, 703a, 703b, 703c, 703d, 703e, etc., of the content characterization system 703. The tasks performed by the operating system comprise, for example, assigning memory to the modules, for example, 703a, 703b, 703c, 703d, 703e, etc., of the content characterization system 703, and to data used by the content characterization system 703, moving data between the memory unit 702 and disk units, and handling input/output operations. The operating system performs the tasks on request by the operations, and after performing the tasks, the operating system transfers the execution control back to the processor 704. The processor 704 continues the execution to obtain outputs. The outputs of the execution of the modules, for example, 703a, 703b, 703c, 703d, 703e, etc., of the content characterization system 703 are displayed to a user accessing the content characterization system 703 on the output device 712.

The non-transitory, computer readable storage medium disclosed herein stores computer program codes comprising instructions executable by at least one processor 704 for dynamically characterizing a website 716 rendered in one or more of multiple languages. The computer program codes comprise a first computer program code for receiving website data from the website 716; a second computer program code for analyzing the received website data in one or more of the multiple languages for characterization of the website 716; a third computer program code for generating multiple structured data objects with a core object for the website 716 based on the analysis of the website data; a fourth computer program code for connecting the generated structured data objects to the core object and the website 716; a fifth computer program code for incorporating changes to the website 716 into the connected structured data objects with the core object dynamically without a need to regenerate the structured data objects; and a sixth program code for communicating relevant structured data objects from the connected structured data objects to a querying network entity in response to a search query from the querying network entity, thereby providing an up-to-date characterization of the website 716 optimal to the search query.

The non-transitory, computer readable storage medium disclosed herein further stores additional computer program codes for performing additional steps that may be required and contemplated for dynamically characterizing a website 716 rendered in one or more of multiple languages. In an embodiment, a single piece of computer program code comprising computer executable instructions performs one or more steps of the computer-implemented method disclosed herein for dynamically characterizing a website 716 rendered in one or more of multiple languages. The computer program codes comprising computer executable instructions are embodied on the non-transitory, computer readable storage medium. The processor 704 of the system 700 retrieves these computer executable instructions and executes them. When the computer executable instructions are executed by the processor 704, the computer executable instructions cause the processor 704 to perform the steps of the computer-implemented method for dynamically characterizing a website 716 rendered in one or more of multiple languages.

In the computer-implemented method disclosed herein, the design and flow of interactions between the content characterization system 703 and the rest of the system 700, with the website 716, the standard sources 717, and the querying network entities 718 via the network 715 is deliberate, designed, and directed. The interactions designed by the content characterization system 703 allow the content characterization system 703 to obtain website data from a website 716. The obtained website data comprises one or more of structured data and unstructured data. From this website data, through the use of another separate and autonomous computer program, the object generation module 703c of content characterization system 703 transforms the obtained unstructured data in the website data to structured data objects with a core object. The object generation module 703c of the content characterization system 703 connects the core object to the website 716 and dynamically updates the structured data objects based on changes to the website 716. In another embodiment, the object generation module 703c of the content characterization system 703 generates structured data objects from the unstructured data, incorporating the changes made to the website dynamically, and incorporates the generated structured data into the existing structured data objects. The content characterization system 703 creates new structured data objects if new data elements not captured by the existing structured data objects are identified in the changes. Through the use of yet another separate and autonomous computer program, the content characterization system 703 communicates structured data objects relevant to a received search query from among the generated structured data objects to querying network entities. The content characterization system 703 executes autonomous computer programs defined by artificial intelligence, machine learning, virtual reality, and data science algorithms to analyze and transform unstructured website data to structured data objects according to preconfigured templates, best practices, and vocabulary from the standard sources 717 and subsequently updates the structured data objects dynamically based on changes in the website 716. To generate structured data objects from unstructured website data based on analysis of the website data, dynamically update the generated structured data objects in response to changes to the website 716, and communicate structured data objects relevant to received search queries to ensure up-to-date and optimal characterization of the website 716 in search results requires more than five (5) separate computer programs, the execution of which cannot be easily or manually executed by a person working with a generic computer. A generic computer using a generic program cannot analyze website data for gleaning metadata suitable for structured data, generate structured data objects with a core object to connect to the website 716, dynamically change the structured data objects when website data changes, and communicate structured data objects relevant to a search query in accordance with the method steps disclosed above.

It is readily apparent in different embodiments that the various methods, algorithms, and computer readable programs disclosed herein are implemented on non-transitory, computer readable storage media appropriately programmed for computing devices. The non-transitory, computer readable storage media participate in providing data, for example, instructions that are read by a computer, a processor, or a similar device. In different embodiments, the "non-transitory, computer readable storage media" also refers to a single medium or multiple media, for example, a centralized database, a distributed database, and/or associated caches and servers that store one or more sets of instructions that are read by a computer, a processor, or a similar device. The "non-transitory, computer readable storage media" also refer to any medium capable of storing or encoding a set of instructions for execution by a computer, a processor, or a similar device and that causes a computer, a processor, or a similar device to perform any one or more of the methods disclosed herein.

In an embodiment, the computer programs that implement the methods and algorithms disclosed herein are stored and transmitted using a variety of media, for example, the computer readable media in various manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, Java®, JavaScript®, Fortran, Ruby, Perl®, Python®, Visual Basic®, hypertext preprocessor (PHP), Microsoft® .NET, Objective-C®, etc. Other object-oriented, functional, scripting, and/or logical programming languages can also be used. In an embodiment, the computer program codes or software programs are stored on or in one or more mediums as object code. In another embodiment, various aspects of the method and the system disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the method and the system disclosed herein are implemented as programmed elements, or non-programmed elements, or any suitable combination thereof.

Where databases are described such as the database 703f, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats comprising relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the system, the databases are integrated to communicate with each other for enabling simultaneous updates of data linked across the databases, when there are any updates to the data in one of the databases.

The method and the system disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The method and the system disclosed herein are not limited to a particular computer system platform, processor, operating system, or network. In an embodiment, one or more aspects of the method and the system disclosed herein are distributed among one or more computer systems, for example, servers configured to provide one or more services to one or more client computers, or to perform a complete task in a distributed system. For example, one or more aspects of the method and the system disclosed herein are performed on a client-server system that comprises components distributed among one or more server systems that perform multiple functions according to various embodiments. These components comprise, for example, executable, intermediate, or interpreted code, which communicate over a network using a communication protocol. The method and the system disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the method and the system disclosed herein. While the method and the system have been described with reference to various embodiments, it is understood that the words, which have been used herein, are words of description and illustration, rather than words of limitation. Further, although the method and the system have been described herein with reference to particular means, materials, techniques, and embodiments, the method, and the system are not intended to be limited to the particulars disclosed herein; rather, the method and the system extend to all functionally equivalent structures, methods and uses, such as are within the scope of the appended claims. While multiple embodiments are disclosed, it will be understood by those skilled in the art, having the benefit of the teachings of this specification, that the method and the system disclosed herein are capable of modifications and other embodiments may be effected and changes may be made thereto, without departing from the scope and spirit of the method and the system disclosed herein.

We claim:
1. A system for dynamically characterizing a multi-language website, the system comprising:
   a non-transitory, computer readable storage medium configured to store computer program instructions and data defined by a content characterization system;
   at least one processor communicatively coupled to the non-transitory, computer readable storage medium, the at least one processor configured to execute the defined computer program instructions; and
   the content characterization system comprising:
      a data reception module configured to receive website data from the multi-language website;
      an analysis module configured to analyze the received website data comprising information in multiple languages for characterization of the multi-language website, wherein the analysis module detects the multiple languages used in the received website data using an artificial intelligence tool and converts schema code into the multiple languages of the website data, wherein the schema code adheres to schema.org standard;
      an object generation module configured to generate a dynamic index-oriented object as a core object for the multi-language website based on the analysis of the website data;
      said object generation module configured to generate a plurality of structured data objects for the website based on the analysis of the website data, wherein said generation of the plurality of structured data objects and the generation of the core object for the multi-language website is based on preconfigured templates adhering to the schema.org standard;
      a bridging module configured to connect the generated plurality of the structured data objects to the core object;
      said bridging module configured to connect the core object to the multi-language website through an application programming interface (API) key to allow changes in the web site data to be dynamically updated in the structured data objects;
      the object generation module further configured to dynamically incorporate changes made to the multi-language website into the plurality of the structured data objects connected with the core object without a need to regenerate the plurality of the structured data objects; and
      a communication module configured to communicate relevant structured data objects from the connected plurality of the structured data objects to a querying network entity in response to a search query from the querying network entity, and provides an up-to-date characterization of the multi-language website optimal to the search query, wherein artificial intelligence, machine learning, fuzzy logic, and data science algorithms are used for the analysis of the website data, for the generation of the structured data objects using the schema code that adheres to the schema.org standard, for the generation of the core object, for dynamically incorporating changes made in the website data into the structured data objects, and for determining structured data objects relevant to the search query.

2. The system of claim 1, wherein the website data comprises one or more of structured data and unstructured data.

3. The system of claim 2, wherein the object generation module generates the structured data from the unstructured data, wherein the object generation module incorporates the generated structured data into existing structured data objects and creates new structured data objects if one or more new data elements not captured by the existing structured data objects are identified in the changes made to the multi-language website.

4. A computer-implemented method for dynamically characterizing a multi-language website, the method employing a content characterization system executable by at least one processor configured to execute computer program instructions for performing the method, the method comprising:

receiving website data from the multi-language website;
analyzing the received website data comprising information in multiple languages for characterization of the multi-language website, wherein the analysis comprises detecting the multiple languages used in the received website data using an artificial intelligence tool and converting schema code into the multiple languages of the website data, wherein the schema code adheres to schema.org standard;
generating a dynamic index-oriented object as a core object for the website based on the analysis of the website data;
generating a plurality of structured data objects for the multi-language website based on the analysis of the website data, wherein said generation of the plurality of structured data objects and the generation of the core object for the multi-language website is based on preconfigured templates adhering to the schema.org standard;
connecting the generated plurality of the structured data objects to the core object;
connecting the core object to the multi-language website through an application programming interface (API) key to allow changes in the web site data to be dynamically updated in the structured data objects;
dynamically incorporating changes made to the multi-language website into the plurality of the structured data objects connected with the core object without a need to regenerate the plurality of the structured data objects; and
communicating relevant structured data objects from the connected plurality of the structured data objects to a querying network entity in response to a search query from the querying network entity, and provides an up-to-date characterization of the multi-language website optimal to the search query, wherein artificial intelligence, machine learning, fuzzy logic, and data science algorithms are used for the analysis of the website data, for the generation of the structured data objects using the schema code that adheres to the schema.org standard, for the generation of the core object, for dynamically incorporating changes made in the website data into the structured data objects, and for determining structured data objects relevant to the search query.

5. The computer-implemented method of claim 4, wherein the website data comprises one or more of structured data and unstructured data.

6. The computer-implemented method of claim 5, wherein the structured data is generated from the unstructured data, wherein the generated structured data is incorporated into the existing structured data objects to create new structured data objects if one or more new data elements not captured by the existing structured data objects are identified in the changes made to the multi-language website.

7. A non-transitory, computer readable storage medium having embodied thereon, computer program codes comprising instructions executable by at least one processor for dynamically characterizing a multi-language website, the computer program codes comprising:

a first computer program code for receiving website data from the multi-language website;

a second computer program code for analyzing the received website data comprising information in multiple languages for characterization of the multi-language website, wherein the analysis comprises detecting the multiple languages used in the received website data using an artificial intelligence tool and converting schema code into the multiple languages of the website data, wherein the schema code adheres to schema.org standard;

a third computer program code for generating a dynamic index-oriented object as a core object for the multi-language website based on the analysis of the website data;

a fourth computer program code for generating a plurality of structured data objects with a core object for the multi-language website based on the analysis of the website data, wherein said generation of the plurality of structured data objects and the generation of the core object for the website is based on preconfigured templates adhering to the schema.org standard;

a fifth computer program code for connecting the generated plurality of the structured data objects to the core object;

a sixth computer program code for connecting the core object to the multi-language website through an application programming interface (API) key to allow changes in the web site data to be dynamically updated in the structured data objects;

a seventh computer program code for dynamically incorporating changes made to the multi-language website into the plurality of the structured data objects connected with the core object without a need to regenerate the plurality of the structured data objects; and an eighth program code for communicating relevant structured data objects from the connected plurality of the structured data objects to a querying network entity in response to a search query from the querying network entity, and provides an up-to-date characterization of the multi-language website optimal to the search query, wherein artificial intelligence, machine learning, fuzzy logic, and data science algorithms are used for the analysis of the website data, for the generation of the structured data objects using the schema code that adheres to the schema.org standard, for the generation of the core object, for dynamically incorporating changes made in the website data into the structured data objects, and for determining structured data objects relevant to the search query.

* * * * *